(12) United States Patent
Larikka

(10) Patent No.: US 10,537,948 B2
(45) Date of Patent: Jan. 21, 2020

(54) METHOD AND APPARATUS FOR SHAPE CUTTING OF A PIPE END

(71) Applicant: Leo Larikka, Vantaa (FI)

(72) Inventor: Leo Larikka, Vantaa (FI)

(*) Notice: Subject to any disclaimer, the term of this patent is extended or adjusted under 35 U.S.C. 154(b) by 62 days.

(21) Appl. No.: 15/569,948

(22) PCT Filed: Apr. 29, 2015

(86) PCT No.: PCT/FI2015/050295
§ 371 (c)(1),
(2) Date: Oct. 27, 2017

(87) PCT Pub. No.: WO2016/174300
PCT Pub. Date: Nov. 3, 2016

(65) Prior Publication Data
US 2018/0154466 A1   Jun. 7, 2018

(51) Int. Cl.
*B23D 21/02*   (2006.01)
*B23D 21/14*   (2006.01)

(52) U.S. Cl.
CPC ............ *B23D 21/02* (2013.01); *B23D 21/14* (2013.01)

(58) Field of Classification Search
CPC .... B23D 21/02; B23D 21/14; B23K 2101/06; B26D 3/14; B26D 9/00; B26F 1/12; Y10T 83/6486; Y10T 83/942; Y10T 83/917; Y10T 83/9442
See application file for complete search history.

(56) References Cited

U.S. PATENT DOCUMENTS

| | | |
|---|---|---|
| 4,194,422 A | 3/1980 | Williams |
| 4,459,886 A | 7/1984 | Belzil |
| 4,986,154 A | 1/1991 | Vernacchio |

(Continued)

FOREIGN PATENT DOCUMENTS

| | | |
|---|---|---|
| AT | 380816 B | 7/1986 |
| AU | 490456 B2 | 1/1978 |
| DE | 906531 C | 3/1954 |

(Continued)

OTHER PUBLICATIONS

Machine translation of DE 1096717, Jan. 1961 (Year: 1961).*
European Patent Office; Extended European Search Report; Communication, 8 Pages.

*Primary Examiner* — Stephen Choi
(74) *Attorney, Agent, or Firm* — Renner Kenner Greive Bobak Taylor & Weber

(57) ABSTRACT

The invention relates to a method and apparatus for shape cutting a pipe end. An arched cutter (4) of a punching tool (3, 4) is inserted into an end of a pipe (1) for penetrating the same into a wall of the pipe (1) in a plane of the arched cutter. Then, the punching tool is displaced in a direction perpendicular to a center axis (C) of the pipe (1), whereby the arched cutter (4), while moving outwards from inside the pipe, shears off a piece that matches its shape. The punching tool (3, 4) is withdrawn out of a pipe end, the punching tool is rotated 180°, it is re-inserted into the pipe end and the punching tool (3, 4) is displaced in a direction which is perpendicular to the pipe center axis (C) and opposite to the previous displacement direction, thus enabling the shearing off the pipe end a second piece matching the shape of the arched cutter (4).

8 Claims, 2 Drawing Sheets

(56) References Cited

Figure 1:
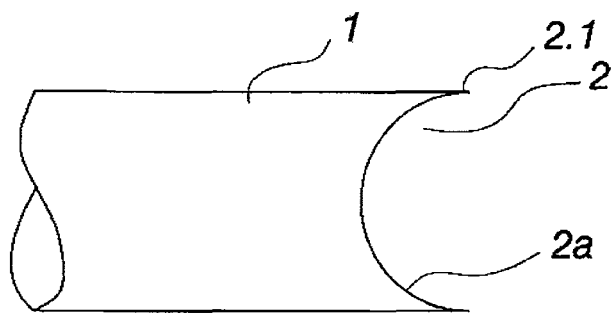

U.S. PATENT DOCUMENTS 7,114,423 B2    10/2006  Kelley
2004/0226421 A1*  11/2004  Kelley .................. B23D 21/02
                                                83/34

FOREIGN PATENT DOCUMENTS

| DE | 1 096 717 B | 1/1961 |
|----|---|---|
| DE | 2432412 A1 | 1/1975 |
| DE | 10 2005 015 642 A1 | 10/2006 |
| FI | 50480 C | 4/1976 |
| FR | 2 639 853 A1 | 6/1990 |
| GB | 1025685 | 4/1966 |
| JP | 61-236417 A | 10/1986 |

* cited by examiner

METHOD AND APPARATUS FOR SHAPE CUTTING OF A PIPE END

The invention relates to a method for shape cutting a pipe end, said method comprising cutting two arc-rimmed pieces from the pipe end by means of a punching tool and a mold, the punching tool having therefore an arc-shaped cutting edge and the mold having a contour arc consistent with the curvature of the cutting edge, and the cutting procedures of the pieces being performed outwardly from within the end of a pipe in two successive cutting phases.

The invention also relates to an apparatus for shape cutting, said apparatus comprising a punching tool provided with a cutting edge consistent with the curvature of a piece to be cut off, and a mold for restraining a pipe to be shaped, the mold having a contour arc consistent with the curvature of the cutting edge.

In the process of making T-junctions for relatively thin-walled flow pipes, the main pipe and a branch pipe are joined to each other by welding. The round tubular shape requires shaping of the pieces to be joined in order to enable the welding.

The most common technique is to conduct welding from outside a pipe on an exterior surface of the pipe. In order to ensure penetration welding, particularly in pipes of considerable thickness, the end of a branch pipe will be cut diagonally in such a way that, when the branch pipe has its end curve in engagement with a surface of the main pipe, the collision point thereof develops an outwardly opening V-groove (chamfer). Such a cutting procedure has been disclosed in Patent publication GB 1,025,685.

In welding techniques, in which the pipes to be joined are welded without a filler metal by fusing pieces to be joined from within the pipe, the pieces to be joined require a different type of preliminary preparation. The front surface (cut end) of a branch pipe that collides with a main pipe must come together over its entire area in a gapless manner (snugly) with an exterior surface of the main pipe. The cutting area of a contoured branch pipe section is not allowed to have cutting burrs in an internal corner of the pipe. Thus, the cutting must be performed outwardly from within.

Patent publication U.S. Pat. No. 4,986,154 discloses a foregoing type of method and tool, which enables contour cutting to be performed outwardly from within a tube. Between operations of cutting off the pieces, the tube must be released, rotated 180°, positioned and secured. Automation of these procedures is difficult. In addition, the shaping of a punching tool requires a major use of force, nor does it enable the engagement of a branch tube's front surface (cut end) over its entire area in a gapless manner (snugly) with an exterior surface of the main pipe as a chord of the cutting edge matches an internal diameter of the tube to be cut. Hence, a section of the tube end between the cutting arcs is left with uncut surfaces made up by a part of the original tube end surface.

Patent publication DE 1096717 discloses a foregoing type of method and apparatus, which enables cutting to be performed outwards from with a pipe with one and the same cutting tool in both directions. In this case, likewise, a section of the pipe end between the cutting arcs is left with uncut surfaces made up by a part of the original pipe end surface. In addition, the cutting tool operating in both directions is difficult to design so as to have a sufficient durability.

An objective of the invention is to provide a method and an apparatus, whereby cutting can be performed outwardly from within a pipe in such a way that a chord of the cutting arc substantially exceeds the internal diameter of a pipe to be cut or can also exceed the external diameter of a pipe to be cut or, if desired, is substantially consistent with the external diameter of a pipe to be shaped.

This objective is attained with a method presented in the appended claim 1 and with an apparatus presented in claim 3. The dependent claims disclose preferred embodiments of the invention.

In addition to a cutting procedure, the shape cutting apparatus must have a capability of using readily replaceable tool arrangements for handling pipe blanks in a given range of sizes and lengths. In addition to this, the apparatus must have a capability of its operation in a working process to be automated in view of handling large volumes. These objectives can also be attained with the invention.

Figure 2:
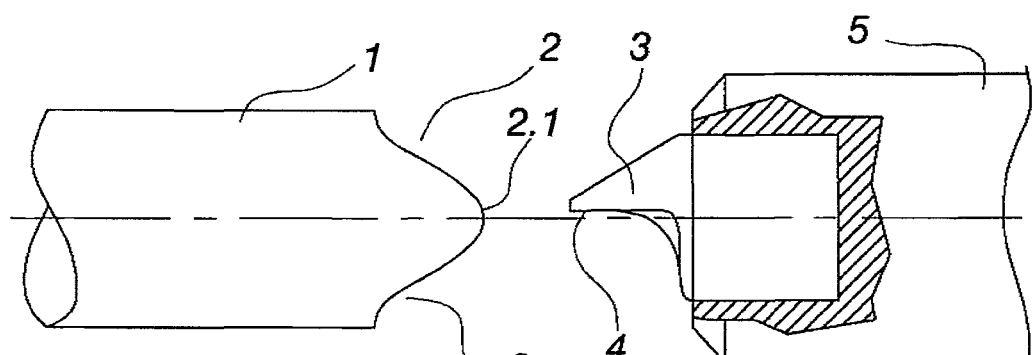
Figure 3:
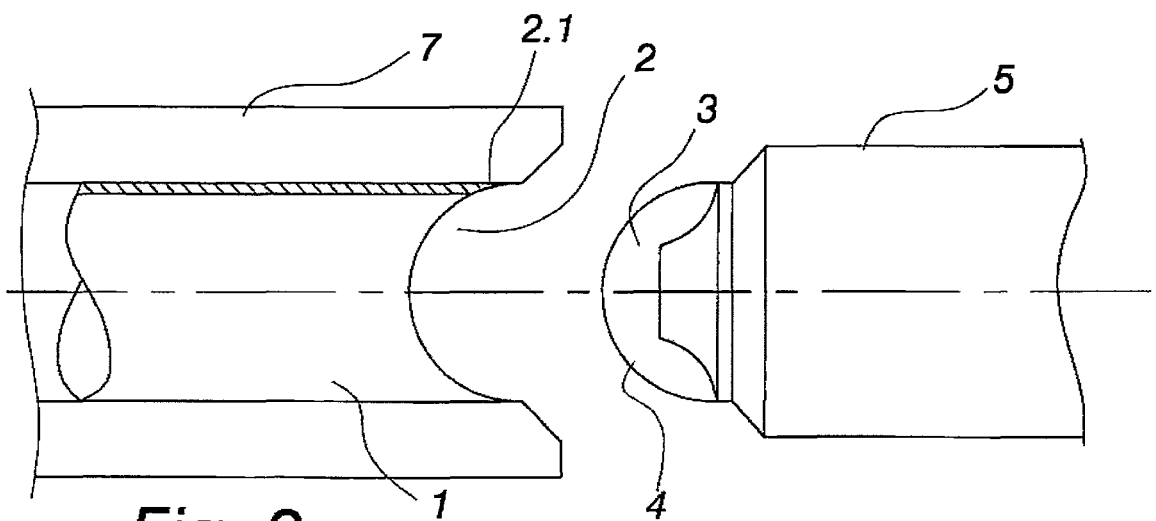
Figure 4:
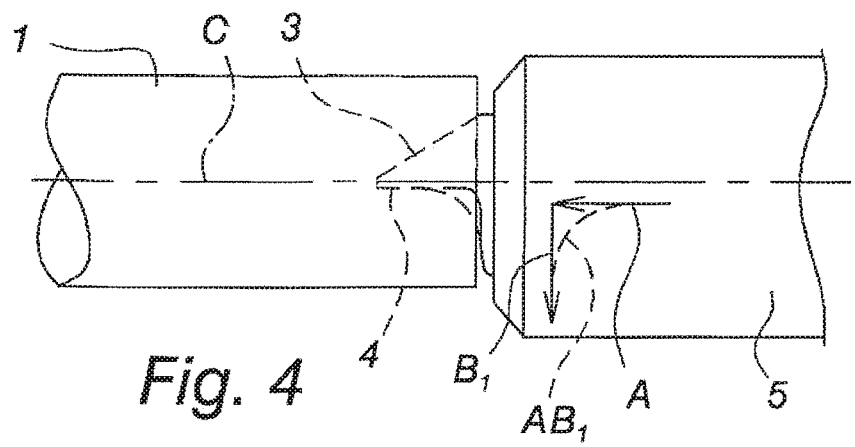
Figure 5:
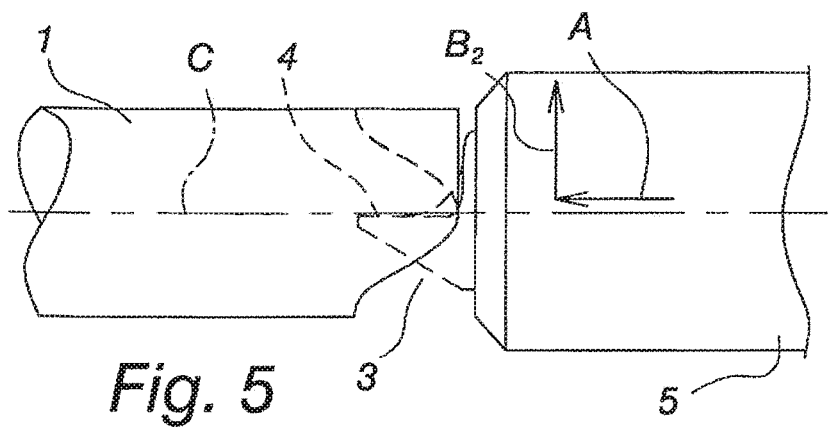
Figure 6:
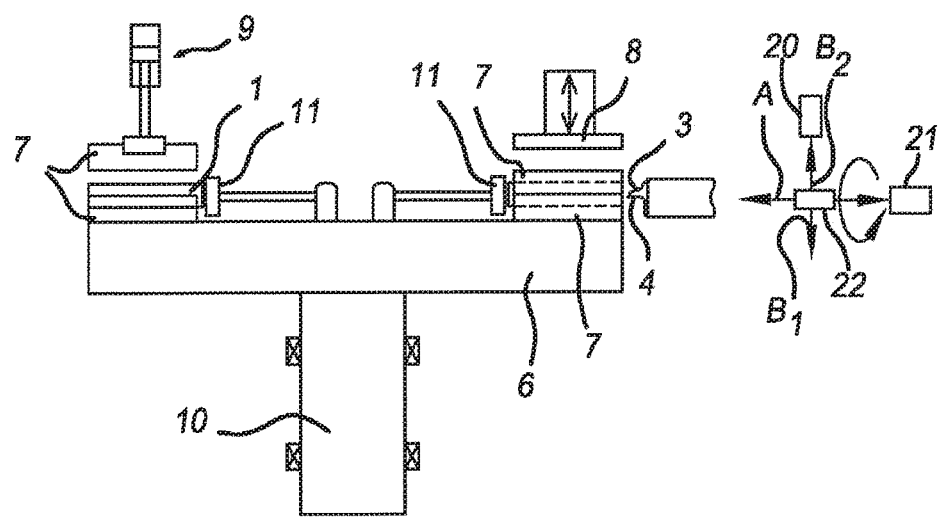

The invention will now be described in more detail with reference to the accompanying drawings, in which:

FIG. 1 shows a shape-cut pipe end in a cutting direction,

FIG. 2 shows a shape-cut pipe end rotated 90° with respect to FIG. 1 and additionally a shape-cutting punch with its punching tool in a side view and in a partial section, FIG. 3 shows a cut pipe placed in a mold 7 and a shape-cutting punch in a plan view, FIG. 4 shows a shape-cutting punch inserted into a pipe end and ready for a first cutting phase, FIG. 5 shows a shape-cutting punch inserted into a pipe end and ready for a second cutting phase, and FIG. 6 shows schematically a shape-cutting apparatus in a side view with arrows indicating movements of various components, and a turntable 6 for supporting and operating the molds 7.

If to the end of a pipe 1 is to be joined another pipe identical or larger in diameter, the pipe 1 must have its end shape-cut for a cutting line 2a which makes an arc in the form of a semicircle or a circular segment as seen in the cutting direction. In the case of pipes identical in diameter, the cutting arc 2a has a radius equal to an external radius of the pipe 1. If the pipe 1 is joined as a branch pipe to a main pipe larger in diameter, the cutting arc 2a must be made respectively with an arc consistent with an external radius of the main pipe. The cutting arc 2a has a chord which is substantially identical to an external diameter of the pipe 1 to be shaped, whereby sharp edges 2.1 developed in junctions of the cutting arcs 2a will be limited to an exterior surface of the pipe.

To the end of a rod 5 co-directional with a center axis C of the pipe 1 is mounted to punching tool 3, 4, which is provided with a sharp-rimmed cutting edge 4 in the shape of a circular arc. The cutting edge has a radius of its arc matching the external radius of a pipe to be joined. This is achieved e.g. by making a flat surface on an otherwise curved surface and obtuse protrusion, whereby the cutting edge 4 is formed by an intersection line of the flat surface and the curved surface.

The apparatus comprises two two-part molds 7, which are provided on a parting plane of the molds with a half-groove matching the diameter of a pipe to be joined. The mold 7 has one of its end edges, as seen perpendicularly to the parting plane, provided with contour arcs consistent with the arc to be cut in a central position relative to the groove on the parting plane, whereby the junctions of the contour arcs and the parting plane develop sharp corners on either side of the parting plane. When the molds are opening, the lower groove functions as a receiving space for a pipe to be cut.

The upper half mold is lowered on top of the pipe and in a cutting position the half molds are pressed immovably against each other.

The cutting is conducted in two successive sequences. Both cutting sequences are performed with one and the same punching tool 3, 4. In a first phase, the punching tool 3, 4 is inserted into an end of the pipe 1 by displacing the rod 5 in an axial direction of the pipe 1, i.e. co-directionally with a center line C of the pipe, while the cutting edge lies in the vicinity of the pipe center line. Towards the end of insertion, it is advisable that the punching tool be simultaneously displaced also in radial direction as shown in FIG. 4 with a dashed line $AB_1$. The punching tool 3, 4 is penetrating into the pipe wall in a plane of the cutting edge 4, since the cutting edge 4 has its chord, with a maximum penetration distance at the end of the pipe 1, corresponding substantially to an external diameter of the pipe 1. When the axial motion of the punching tool 3, 4 has reached its extreme position, the displacement of the rod 5 will occur perpendicularly to the axial direction of the pipe 1. In the illustrated case, this displacement direction $B_1$ is downward in FIG. 4 for cutting a first piece 2 matching the punching tool shape off the end of the pipe 1 against a contour arc present on a first side of the parting plane of the mold 7. The cutting edge 4 by-passes the contour arc at a close distance.

For a second cutting phase, the punching tool is withdrawn out of the pipe end by displacing the rod 5 in axial direction away from the pipe 1. This is followed by rotating the rod 180° around its axis, whereby the cutting edge 4 also rotates 180°, after which the rod 5 is displaced in the direction of an arrow A for re-inserting the punching tool 3, 4 into the end of the pipe 1. At this point, the cutting edge 4 lies at an adjusted distance relative to the center line C closer to the first cutting. This is followed by displacing the rod 5 and respectively the punching tool 3, 4 in a direction $B_2$ which is perpendicular to the center line C of the pipe 1 and which is opposite to the previous displacement direction $B_1$, thus enabling a second piece matching the shape of the cutting edge 4 to be cut off the pipe end against a contour arc of the mold. In the illustrated case (FIG. 5), the displacement direction $B_2$ is upwards.

As depicted in FIG. 4, the cutting edge 4 of a punching tool is inserted into an end of the pipe 1 and penetrated into a wall of the pipe in a plane of the cutting edge 4 below the pipe center line C, and the punching tool is pressed downwards for cutting a piece matching the shape of the cutting edge 4 off a bottom edge of the pipe end. Having been withdrawn out and rotated through 180°, the punching tool 3, 4 is re-inserted into the pipe end (FIG. 5) so as to place the cutting edge 4 again below the pipe center line C, thus enabling the cutting off of a second piece by lifting the punching tool 3, 4 upward. In the condition shown in FIG. 5, the piece 2 cut off a bottom edge of the pipe end provides a space for the punching tool 3, 4. With this arrangement, the punching tool can be designed so as to provide a solid support near the cutting edge 4 on that side of the cutting edge plane which follows behind the cutting edge during the course of a cutting displacement. Thereby, the punching tool is made durable.

Naturally, the first and second cutting phases can also be conducted in opposite displacement directions in such a way that the cutting edge 4 is inserted into a pipe end above the pipe center line C and the punching tool is lifted upward for cutting a piece matching the shape of the tool curvature off a top edge of the pipe end. In the second sequence, once the punching tool 3, 4 has been rotated through 180°, the cutting edge 4 is inserted into the pipe again above the center line C and the punching tool is pressed downward for cutting a second piece matching the shape of the cutting edge off a bottom edge of the pipe end. Illustrated in FIGS. 4 and 5 is an alternative, wherein the cutting is commenced from the bottom edge of a pipe end.

FIG. 6 shows an apparatus providing external support for a pipe 1 to be cut and for a mold 7. Two two-part molds 7 are supported on a turntable 6 which is rotatable around a vertical rotation shaft 10 through 180° for displacing the mold 7 from a loading position to a cutting position and for simultaneously displacing the other mold from a cutting position to a loading position. On either side of the rotation shaft 10 is a backstop 11 for the pipe 1 to be shaped, which determines the pipe position and holds the pipe axially stationary while a punching tool 3, 4 is being inserted into the pipe. A retainer 8 presses the half molds together and holds the mold 7 stationary during the shape cutting of a pipe end. On the opposite side of the turntable 6, a lifting grapple 9 raises an upper half of the mold 7 up for replacing the pipe. While cutting a second pipe, one of the molds is relieved of the already cut pipe and the mold is supplied with another pipe to be cut. The retainer 8 is lowered on top of a mold 7 holding the pipe 1 for bracing the mold during a cutting procedure. The retainer 8 is lifted up for as long as it takes to rotate the turntable 6. Elements 20 and 21 represent hydraulic cylinders used for linear movements of the punching tool 3, 4 and element 22 represents a rotation motor for rotational movement of the punching tool 3, 4.

Even though the preferred embodiment has just one punching tool for both cutting phases, it is possible to employ two jointly or separately movable punching tools with pre-established directions opposite to each other in a manner corresponding to FIGS. 4 and 5.

The invention claimed is:

1. A method for shape cutting a pipe end, said method comprising: cutting two arc-rimmed pieces (2) from the pipe end, wherein performance of the cutting occurs by means of a punching tool (3, 4) having an arc-shaped cutting edge (4) for said cutting; holding the pipe by a mold (7), the mold having a parting plane enabling opening and two contour arcs consistent with the curvature of the cutting edge, wherein performance of the cutting procedures of the pieces (2) occurs in directions outwardly from within the end of a pipe (1) in two successive cutting phases; inserting the punching tool (3, 4) into the pipe end by displacing the punching tool co-directionally with a center line (C) of the pipe, while the cutting edge (4) lies in the vicinity of the pipe center line (C); performing a first cutting phase by displacing the punching tool in a first displacement direction ($B_1$) which is perpendicular to the center line, whereby the cutting edge shears off a first piece against the contour arc present on a first side of the parting plane of the mold (7); rotating the punching tool 180° around an axis which is parallel with the center line (C) of the pipe, said rotating taking place after the first cutting phase shearing off the first piece; and performing a second cutting phase by displacing the rotated punching tool perpendicularly relative to the center line (C) in a second displacement direction ($B_2$) opposite to the first displacement direction ($B_1$), whereby the cutting edge shears off a second piece against the contour arc present on a second side of the mold's parting plane.

2. The method according to claim 1, characterized in that the first perpendicular cutting displacement in the first displacement direction ($B_1$) is preceded by causing the cutting edge (4) to penetrate into a wall of the pipe on a side of the pipe center line where a first-to-be-cut piece (2) is located, and the second cutting displacement in the second displacement direction ($B_2$) is preceded by inserting the punching tool (3, 4) into an end of the pipe (1) to a position at which a plane of the cutting edge (4) is on a side of the pipe center axis (C) from where the plane of the cutting edge commences and bypassing the center axis (C) as the punching tool (3, 4) is being displaced for shearing off the second piece (2).

3. An apparatus for shape cutting a pipe end, said apparatus comprising a mold (7) for supporting a pipe (1) to be shaped, and a punching tool (3, 4) having a cutting edge (4) which has a curvature consistent with a curvature of a piece (2) to be cut off; wherein the mold (7) being provided with contour arcs matching the curvature of the cutting edge on either side of a parting plane of the mold; wherein the punching tool (3, 4) being arranged to be displaced alternatively in two directions ($B_1$, $B_2$) which are opposite to each other and substantially perpendicular to a center line (C) of the mold (7) and the pipe (1), which is supported by the mold (7) in the shape cutting position of the pipe (1); wherein the punching tool (3, 4) is arranged to be inserted into an end of the pipe (1) by displacing the punching tool (3, 4) in an axial direction (A) of the mold (7) and the pipe (1) supported by the mold (7) in the shape cutting position of the pipe (1); wherein the punching tool (3, 4) is rotatably disposed relative to the mold (7) around a rotation axis which is parallel with the center line (C) of the mold (7) and the pipe (1); and wherein the cutting edge (4) is arranged to be rotated around said rotation axis through 180° -between said displacement in two direction ($B_1$, $B_2$).

4. The apparatus according to claim 3, wherein the punching tool (3, 4) has a solid supporting mass, which provides support for the cutting edge (4) and lies behind the cutting edge as the cutting edge is seen in the cutting displacement direction, the cutting edge delimiting a flat surface.

5. The apparatus according to claim 3, wherein the cutting edge (4) is a semicircular or circular segment-shaped arc, which is the edge of an obtuse protrusion, and wherein the cutting edge (4) has a radius of curvature which is substantially equal to or exceeds an internal radius of the mold (7).

6. The apparatus according to claim 3, wherein the punching tool (3, 4) is mounted on the end of an actuation rod (5), the actuation rod (5) having a longitudinal axis which is co-directional with the center line (C) of the pipe (1) when the pipe is supported by the mold (7) in the shape cutting position of the pipe (1); wherein the actuation rod (5) is arranged to be displaced co-directionally in an axial direction (A) with the center line (C) of the pipe (1) for inserting the punching tool (3, 4) into an end of the pipe (1) and toward the end of the insertion; wherein the punching tool (3, 4) is arranged to be displaced also in direction ($B_1$) simultaneously with the co-directional axial direction (A); wherein the actuation rod (5) is arranged to be displaced in the first direction ($B_1$) perpendicular to the center line of the pipe (1); wherein the actuation rod (5) is arranged to be rotated 180° around its longitudinal axis; and wherein the actuation rod (5) is arranged to be driven in the second direction ($B_2$) opposite to said first direction $B_1$.

7. The apparatus according to claim 3, characterized in that the apparatus comprises two two-part openable molds (7), both of which are supported on a turntable (6), which is rotatable around a vertical rotation shaft (10) through 180° for displacing the mold (7) from a loading position to a cutting position and for displacing the other mold from a cutting position to a loading position, and that on either side of the rotation shaft (10) there is provided a backstop (11) for the pipe (1) to be shaped, which determines the pipe position and holds the pipe axially stationary as the punching tool (3, 4) is being inserted into the pipe.

8. The apparatus according to claim 3, characterized in that the apparatus comprises two two-part molds (7), which on a parting plane of the molds have a half-groove matching the diameter of a pipe to be cut, that one end edge of the mold (7), as seen perpendicularly to the parting plane, is provided with contour arcs matching a curve to be cut and located concentrically relative to the groove on the parting plane, whereby junctions of the contour arcs and the parting plane develop sharp corners on either side of the parting plane.

\* \* \* \* \*